United States Patent [19]

Roussel

[11] Patent Number: 5,255,874

[45] Date of Patent: Oct. 26, 1993

[54] WHEEL PROTECTOR

[76] Inventor: Jean-Claude P. A. Roussel, 20 Tritonia Road, Table View, Cape Town, Cape Province, South Africa

[21] Appl. No.: 911,010

[22] Filed: Jul. 9, 1992

[51] Int. Cl.⁵ .......................................... B64D 47/00
[52] U.S. Cl. ............................... 244/103 R; 206/303; 206/509; 206/459.5; 206/821; 301/37.1; 301/37.27
[58] Field of Search ............... 244/103 R; 301/37 R, 301/37 CM, 37 SC; 206/303, 509, 821, 459.5

[56] References Cited

U.S. PATENT DOCUMENTS

| | | | |
|---|---|---|---|
| 3,066,986 | 12/1962 | Hollar | 301/37 SC |
| 3,921,798 | 11/1975 | Dean et al. | 206/459.5 |
| 4,234,092 | 11/1980 | Axel | 206/591 |
| 4,304,279 | 7/1992 | Thomas . | |
| 4,344,654 | 8/1982 | Apezysnki | 301/37 R |
| 4,383,716 | 5/1983 | Osborn | 301/37 R |
| 4,785,992 | 11/1988 | Goeppner | 206/509 |
| 4,790,430 | 12/1988 | Thomas | 206/303 |
| 4,796,757 | 1/1989 | Strunkmann-Meister | 206/509 |
| 4,844,263 | 7/1989 | Hadtke | 206/509 |

Primary Examiner—Galen Barefoot
Attorney, Agent, or Firm—Ladas & Parry

[57] ABSTRACT

A wheel protector for protecting a demounted aircraft wheel 54 and its bearing sets 56.1, 56.2 comprises an inboard cover disc 10, and an outboard cover disc 12. An axially outwardly extending part 18 of the inboard cover disc slopes at an angle radially inwardly so as to form a deflecting surface for objects approaching the cover disc in a radial direction. The inboard cover disc has flutings 28 which form between them recesses for accommodating the brake lugs of an aircraft wheel. When in position, the inboard cover disc also protects the heat shields which are located between the brake lugs. A ridge formation 38 serves to locate a pair of wheels against sliding relative to one another when stacked. Foam pads 32.1, 32.2, 33, 40 and 41 are provided where the cover discs contact the wheel or its bearing sets.

12 Claims, 4 Drawing Sheets

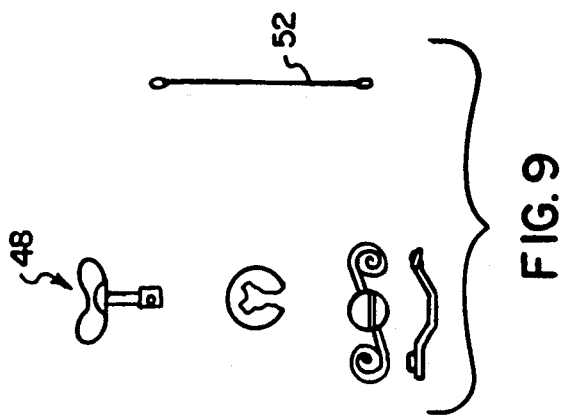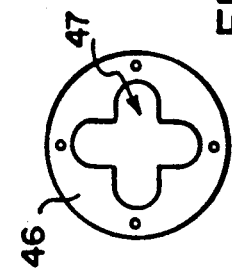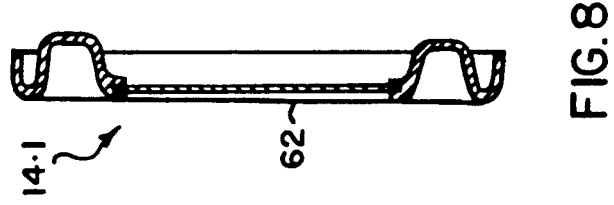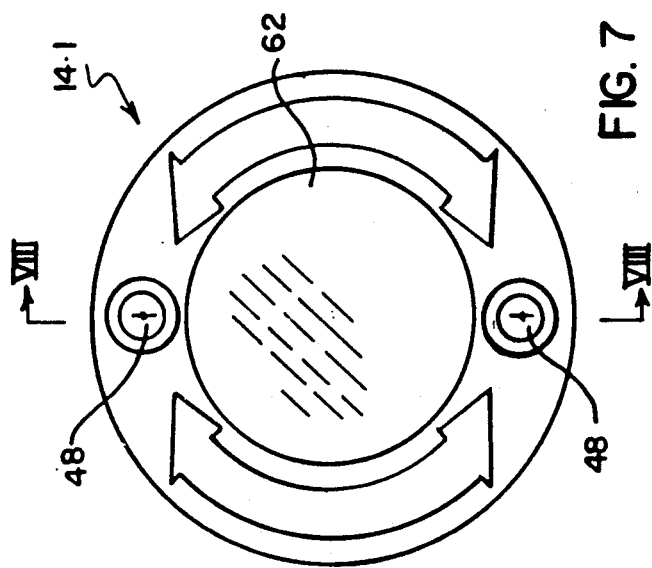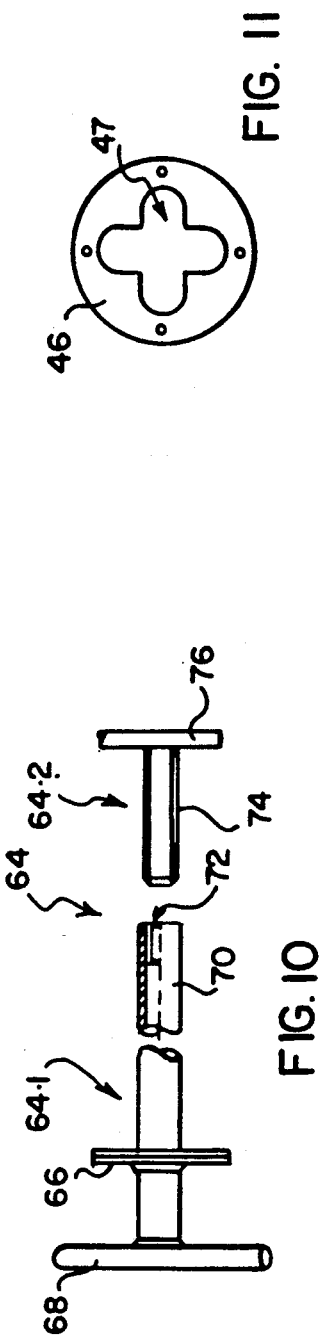

WHEEL PROTECTOR

FIELD OF THE INVENTION

THIS INVENTION relates to a wheel protector for protecting a demounted aircraft wheel and its bearing sets, of the kind comprising an inboard cover disc for covering the inboard side of the wheel, and an outboard cover disc for covering the outboard side of the wheel.

BACKGROUND OF THE INVENTION

Wheel protectors of this type are known from U.S. Pat. No. 4,304,279 to Thomas. They suffer from a number of disadvantages. A major disadvantage is that they are easily damaged. This arises from the inevitable fact that, when mounted, the cover discs protrude axially from the wheel. When a wheel with the cover discs in position is rolled along, as is often done by workmen when moving the wheel from one place to another, and accidentally knocks against an obstacle, one of the cover discs usually takes the full impact of the blow. Because of the high inertia of the wheel in comparison with the light weight construction of the cover discs, the impact is often too severe for the cover disc to withstand, and as a consequence it breaks.

It is therefore an object of the present invention to provide a wheel protector which is better able to withstand impacts of this nature.

It is a further object of the present invention to provide a wheel protector which has a convenient storage space for the serviceability sheet of the wheel and its bearing sets, which serviceability sheet, in terms of aviation regulations, has to accompany the wheel at all times.

It is yet a further object of the invention to provide a wheel protector which will improve the stackability of wheels which have been fitted with them.

SUMMARY OF THE INVENTION

According to first aspect of the invention broadly there is provided a wheel protector for protecting a demounted aircraft wheel and its bearing sets, the wheel protector comprising an inboard cover disc for covering the inboard side of the wheel, and an outboard cover disc for covering the outboard side of the wheel, one of the cover discs comprising a first annular wall portion which defines a peripherally extending rim whereby the cover disc, in use, seats on the wheel and which first annular wall portion extends from the rim axially outwardly to a region of maximum axial extent, and a second annular wall portion disposed radially inwardly of the first annular wall portion and which extends from the region of maximum axial extent axially inwardly, to form on the inside of the cover disc an annular recess for accommodating an axially protruding part of the wheel, the first annular wall portion, for the greater part of the axial extent thereof, being inclined at an angle of at least 30° with respect to the axial direction so as to form an inclined deflecting surface for objects approaching the cover disc in a radial direction.

According to a second aspect of the invention broadly there is provided a wheel protector for protecting a demounted aircraft wheel and its bearing sets, the wheel protector comprising an inboard cover disc for covering the inboard side of the wheel, and an outboard cover disc for covering the outboard side of the wheel, one of the cover discs comprising a first annular wall portion which defines a peripherally extending rim whereby the cover disc, in use, seats on the wheel and which first annular wall portion which extends from the rim axially outwardly to a region of maximum axial extent, a second wall portion disposed radially inwardly of the first annular wall portion and which extends from the region of maximum axial extent axially inwardly, and a central, radially extending wall portion disposed axially inwardly of the region of maximum axial extent, and which wheel protector further comprises a disc-shaped document cover which is attachable to said one of the cover discs to form with the central portion a compartment for holding documents relating to the wheel on which the wheel protector is mounted.

According to a third aspect of the invention broadly there is provided a wheel protector for protecting a demounted aircraft wheel and its bearing sets, the wheel protector comprising an inboard cover disc for covering the inboard side of the wheel, and an outboard cover disc for covering the outboard side of the wheel, one of the cover discs comprising a rim and a wall portion which extends from the rim axially outwardly, then radially inwardly, and then axially inwardly again, to form on the inside of the cover disc a recess for accommodating an axially protruding part of the wheel, and the other of said cover discs having a locating formation whose arrangement is such that, when a pair of wheels each with such a wheel protector in position thereon are stacked one on top of the other, the locating formation of one of the wheel protectors cooperates with the axially inwardly extending part of said wall portion of the other wheel protector to resist sliding of the two wheels with respect to one another.

According to a fourth aspect of the invention broadly there is provided a wheel protector for protecting a demounted aircraft wheel and its bearing sets, the wheel protector comprising an inboard cover disc for covering the inboard side of the wheel, and an outboard cover disc for covering the outboard side of the wheel, at least one of the cover discs having a pad of compressible material on the inside thereof, via which the cover disc contacts the wheel or its bearing set when the cover disc is in position on the wheel.

BRIEF DESCRIPTION OF THE DRAWINGS

The invention will now be described in more detail, by way of example, with reference to the accompanying drawings.

In the drawings:

FIG. 7 is a plan view of a document cover forming part of the wheel protector;

FIG. 8 is a cross-section of the document cover, on line VIII—VIII in FIG. 7;

FIG. 9 illustrates various fittings used for fastening the document cover to the outboard cover disc;

FIG. 10 illustrates a tie rod for securing the two cover discs in position on a wheel; and FIG. 11 illustrates a reinforcing plate forming part of the outboard cover disc.

DETAILED DESCRIPTION OF PREFERRED EMBODIMENT

Figure 2:
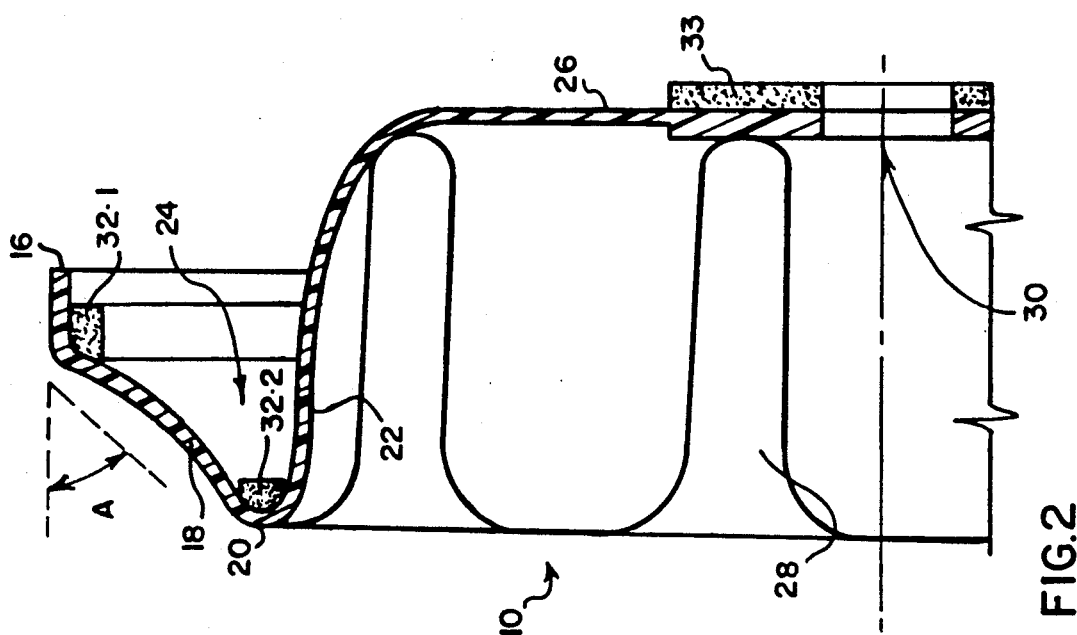
FIG. 2 is a cross-section of the inboard cover disc on line II—II in FIG. 1, drawn to a larger scale.
Figure 1:
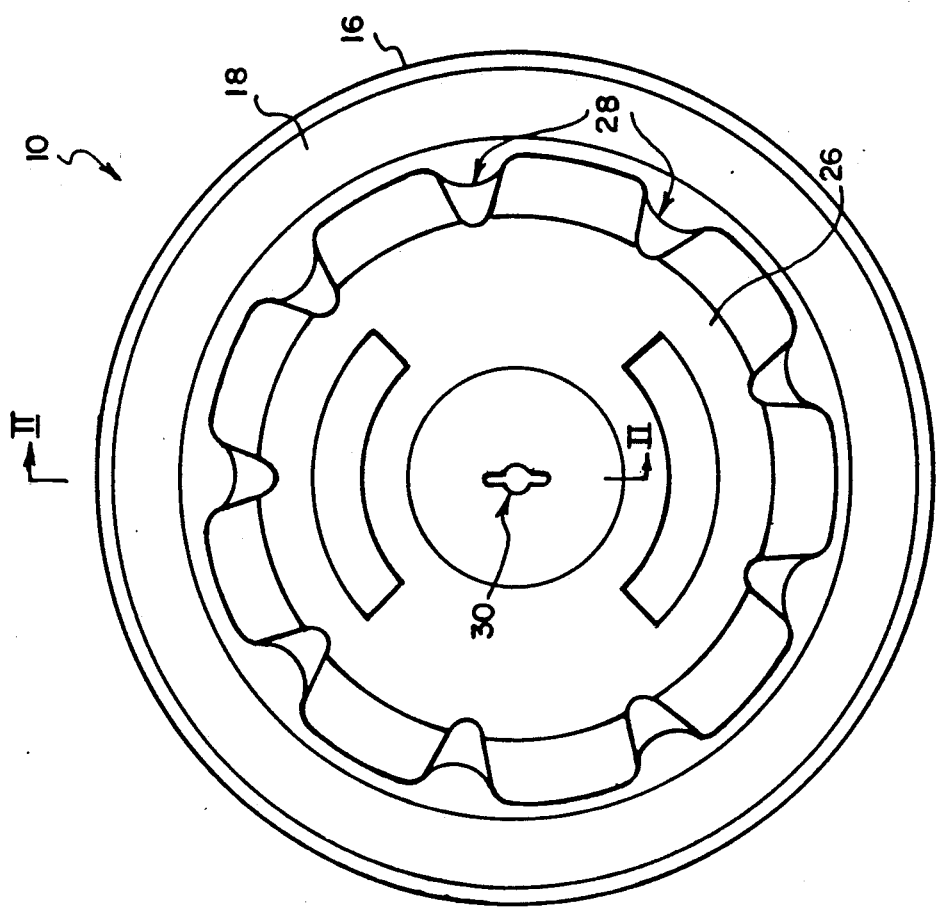
FIG. 1 is a plan view of an inboard cover disc forming part of a wheel protector in accordance with the invention.
Figure 4:
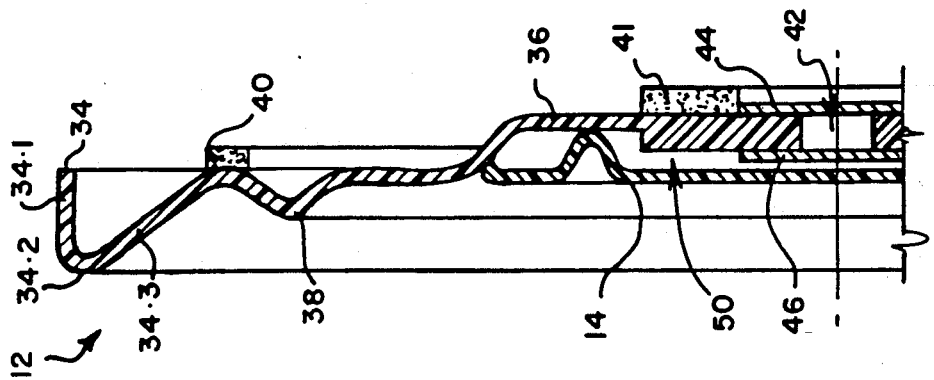
FIG. 4 is a cross-section of the outboard cover disc and document cover on line IV—IV in FIG. 3, drawn to a larger scale.
Figure 3:
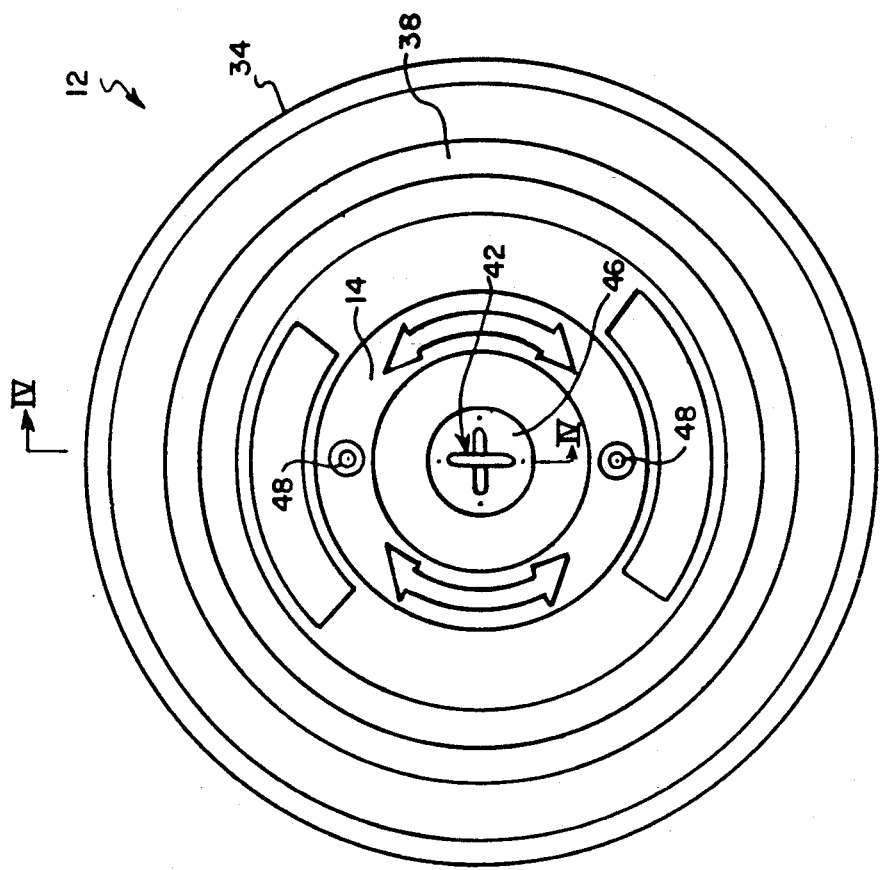
FIG. 3 is a plan view of an outboard cover disc with a document cover in position, forming part of the wheel protector.

Referring first to FIGS. 1 to 4, there is shown a wheel protector which comprises an inboard cover disc 10 (FIGS. 1 and 2), an outboard cover disc 12 (FIGS. 3 and 4), and a document cover 14 (also FIGS. 3 and 4). The cover discs 10, 12 and the document cover 14 are mainly of glass fibre reinforced plastics material.

The inboard cover disc 10 comprises a first annular wall portion which defines a peripherally extending rim 16 and extends from the rim axially outwardly as indicated at 18, to a region of maximum axial extent as indicated at 20, a second annular wall portion 22 disposed radially inwardly of the wall portion 18 and extending from the region 20 axially inwardly, the wall portions 18 and 22 forming an annular recess 24 on the inside of the cover disc, and a central, radially extending portion 26. As will be described hereinafter, with reference to FIG. 5, the recess 24 is provided to accommodate the axially protruding brake housing of an aircraft wheel, The wall portion 18 is inclined at an angle A to the axial direction, which angle is 90° at the region 20, rapidly decreases to about 30° and then gradually increases again to about 60° until for the last, minor part of the axial extent of the wall portion 18, it decreases to about 0°. The part 22 is provided with flutings 28. The flutings 28 form between them, on the inside of the cover disc, recesses for accommodating the brake lugs of the aircraft wheel.

In the centre of the inboard cover disc 10 there is a slotted hole 30.

On the inside of the cover disc 10 there is a pair of annular pads 32.1 and 32.2 of high density foam material. On the inside of the central portion 26 there is a further pad 33, also of high density foam material.

The outboard cover disc 12 comprises a first annular wall portion 34.1 which defines a rim 34 and extends from the rim axially outwardly to a region of maximum axial extent 34.2, a second annular wall portion 34.3 which extends from the region 34.2 axially inwardly, and a central portion 36. The central portion 36 has an annular ridge formation 38 which protrudes from the outside of the cover disc. On the inside of the cover disc, radially between the rim 34 and the ridge 38, there is an annular pad 40 of high density foam material. On the inside of the central portion 36 there is a further pad 41, also of high density foam material.

At the centre of the central portion 36 there is a slotted hole 42 and, on each opposite side of the cover disc, reinforcing plates 44 and 46. The reinforcing plate 44 has a slotted hole therein which is aligned with the slotted hole 42. The other reinforcing plate 46 has a cruciform hole therein as shown at 47 in FIG. 11.

The document cover 14 is attached to the outboard cover disc by means of a pair of quick-release fasteners 48, also illustrated in FIG. 9. The document cover 14 and the outboard cover disc 12 form between them a cavity 50 in which documents can be accommodated, more particularly the documents referred to as serviceability sheets which are required by regulation for identifying and holding the maintenance record of the aircraft wheel on which the wheel protector is mounted. The documents may be tied to one of the fasteners 48 by means of a length of string 52 illustrated in FIG. 9.

Figure 5:
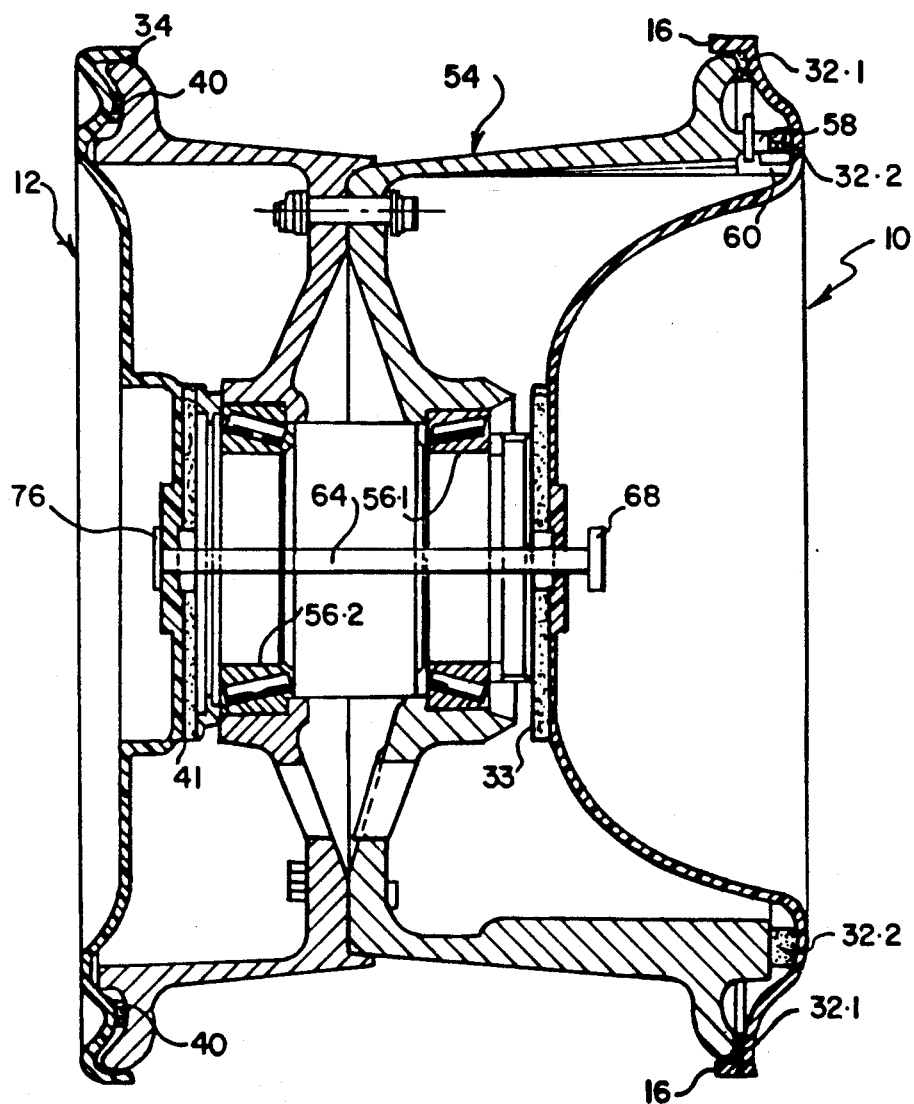
FIG. 5 is a cross-section showing the inboard and outboard cover discs in position on an aircraft wheel.

Referring now to FIG. 5, the inboard and outboard cover discs 10, 12 are shown mounted on an aircraft wheel 54 having an inner bearing set 56.1 and an outer bearing set 56.2. The tire normally mounted on the wheel is not shown. It will be seen that, when thus in position, the cover discs 10 and 12 contact the wheel rims via the foam pads 32.1, 32.2 and 40. This has been found to reduce the risk of damage to the wheel 54 substantially. It has also been found that the pads 32.1, 32.2, and 40 reduce the risk of damage to the cover discs, since the pads are effective to absorb part of the impact when the cover discs receive a knock through manhandling of a wheel on which they are mounted.

It will furthermore be seen that the foam pad 33 presses on the inner bearing set 56.1 to prevent the bearing set from becoming dislodged from its seat. Likewise, the foam pad 41 presses on the outer bearing set 56.2 to prevent the latter from becoming dislodged from its seat. Reference numeral 58 indicates the axially protruding part of the brake housing of the wheel 54, and it will be seen that this is accommodated in the recess 24. On the inside of the brake housing 58 of the particular type of aircraft wheel illustrated there are a number of circumferentially spaced brake lugs 60. Between the brake lugs 60 there are heat shields (not shown). The purpose of the brake lugs is to locate and lock the heat shields in position and also, when the wheel is mounted, to locate the brake assembly. The inboard cover disc 10 also serves to protect the heat shields against damage.

Figure 6:
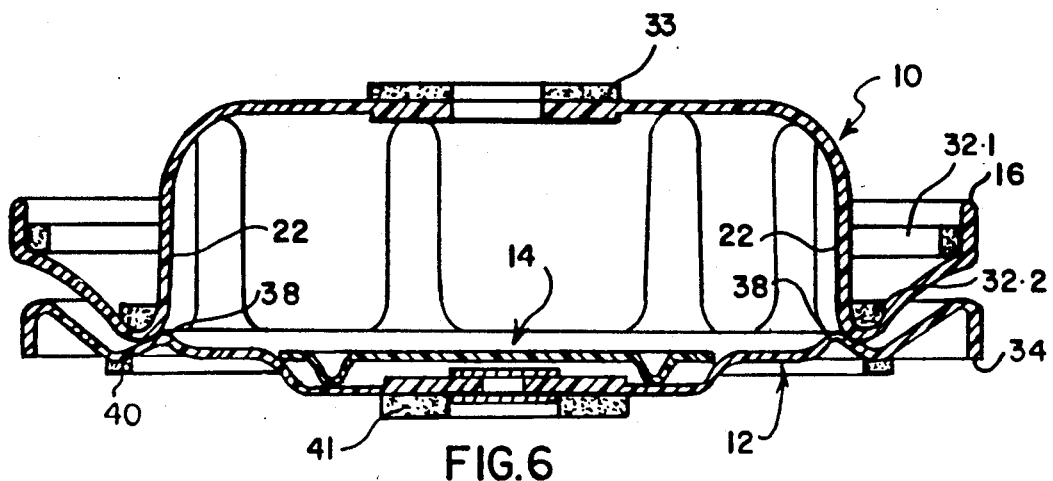
FIG. 6 is a cross-section illustrating the inboard cover disc of one wheel protector resting on the outboard cover disc of another wheel protector.

Referring now to FIG. 6, it will be seen that the diameter of the ridge formation 38 of the outboard cover disc 12 is slightly smaller than the diameter of the axially inwardly extending part 22 of the inboard cover disc. The result of this is that when two wheels with the cover discs mounted thereon are stacked one on top of the other, the ridge formation 38 of the outboard cover disc engages with the part 22 of the inboard cover disc so as to resist sliding movement of the two wheels with respect to one another. Thus, the stacked wheels are located firmly with respect to one another as a result of these formations.

Referring now to FIGS. 7 and 8, there is shown a document cover 14.1 which has a slightly different construction to that illustrated in FIGS. 3 and 4. The document cover illustrated in FIGS. 7 and 8 has a transparent window 62 through which documents held in position by the document cover are visible, so as to permit inspection without it being necessary to remove the documents from behind the document cover.

Referring now to FIG. 10, reference numeral 64 illustrates a fixing rod for securing the inboard and outboard cover discs 10, 12 in position on the wheel 54. The fixing rod comprises two component parts, namely a first component part 64.1 and a second component part 64.2. The first component part 64.1 has a flange 66, a handle 68 on one side of the flange, a shank 70 on the other side of the disc, and a screw-threaded socket 72 at the end of the shank. The other component part 64.2 comprises a screw-threaded stud 74 and a transversely extending rod 76 secured to one end thereof. The screw-threaded stud 74 is normally screwed into the socket 72.

In use, to secure the cover discs 10 and 12 in position on the aircraft wheel 54, the fixing rod 64 is inserted in position, with the transverse rod 76 passing first through the opening 30 and then through the opening 42, and the entire fixing rod is then twisted through 90° and pulled back, causing the rod 76 to engage with the reinforcing plate 46, preventing it from rotating. The handle 68 is now rotated, causing the parts 64.1 and 64.2 to be drawn together, until the flange 66 abuts against the inboard cover disc 10. The cover discs 10 and 12 are now securely mounted on the wheel 54.

It has been found that conventional wheel protectors without the foam pads 32.1, 32.2, 40 and 33, 41 do not adequately protect an aircraft wheel. When the aircraft wheel is subjected to rough handling, the glass fibre reinforced material is liable to crack and weaken, and the aircraft wheel can then become damaged. It has been found that the provision of the foam pads 32.1, 32.2 and 40 enables the cover discs to continue to protect the wheel 54 even after the glass fibre reinforced plastic material of the cover discs has cracked.

The sloping wall portion 18 of the inboard cover disc has been found to reduce the risk of damage to the inboard cover disc substantially, in that, when an aircraft wheel with the cover discs in position thereon is rolled along a surface, the inclined disposition of the part 18 causes objects in the way of the wheel to be deflected from the wheel cover rather than to impact against it head-on.

What I claim is:

1. A wheel protector for protecting a demounted aircraft wheel and its bearing sets, the wheel protector comprising an inboard cover disc for covering the inboard side of the wheel, and an outboard cover disc for covering the outboard side of the wheel, one of the cover discs comprising a first annular wall portion which defines a peripherally extending rim whereby the cover disc, in use, seats on the wheel and which first annular wall portion extends from the rim axially outwardly to a region of maximum axial extent, and a second annular wall portion disposed radially inwardly of the first annular wall portion and which extends from the region of maximum axial extent axially inwardly, to form on the inside of the cover disc an annular recess for accommodating an axially protruding part of the wheel, the first annular wall portion, for the greater part of the axial extent thereof, being inclined at an angle of at least 30° with respect to the axial direction so as to form an inclined deflecting surface for objects approaching the cover disc in a radial direction.

2. A wheel protector according to claim 1, for an aircraft wheel having a series of circumferentially spaced brake lugs on said axially protruding part, wherein said second annular wall portion is formed with a plurality of circumferentially spaced, axially extending flutings for accommodating the brake lugs therebetween.

3. A wheel protector according to claim 1, wherein the other of said cover discs comprises a first annular wall portion which defines a peripherally extending rim whereby the cover disc, in use, seats on the wheel and which first annular wall portion extends from the respective rim axially outwardly to a region of maximum axial extent, a second wall portion disposed radially inwardly of the respective first annular wall portion and which extends from the respective region of maximum axial extent axially inwardly, and a central, radially extending wall portion disposed axially inwardly of the respective region of maximum axial extent and which wheel protector further comprises a disc-shaped document cover which is attachable to said other cover disc in the region of the central wall portion so as to be disposed axially inwardly of the respective region of maximum axial extent and form with the central wall portion a compartment for holding documents relating to the wheel on which the wheel protector is mounted.

4. A wheel protector according to claim 3, wherein the document cover has a window therein through which the documents are visible.

5. A wheel protector according to claim 1, wherein the other of said cover discs has a locating formation whose arrangement is such that, when a pair of wheels each with such a wheel protector in position thereon are stacked one on top of the other, the locating formation of one of the wheel protectors co-operates with said second annular wall portion of the other wheel protector to resist sliding of the two wheels with respect to one another.

6. A wheel protector according to claim 4, wherein the locating formation is in the form of a circumferentially extending, axially outwardly protruding ridge which has a diameter slightly smaller than that of said second annular wall portion.

7. A wheel protector according to claim 1, wherein at least one of the cover discs has a pad of compressible material on the inside thereof, via which the cover disc contacts the wheel or its bearing set when the cover disc is in position on the wheel.

8. A wheel protector according to claim 7, wherein the pad is of a foamed plastics material.

9. A wheel protector according to claim 7, wherein the pad is annular, and is arranged near the periphery of the cover disc so as to contact the rim of the wheel when the cover disc is in position on the wheel.

10. A wheel protector according to claim 1, wherein the first annular wall portion, for the greater part of the axial extent thereof and continuously from the region of maximum axial extent, is inclined at an angle of at least 30° with respect to the axial direction.

11. A wheel protector for protecting a demounted aircraft wheel and its bearing sets, the wheel protector comprising an inboard cover disc for covering the inboard side of the wheel and an outboard cover disc for covering the outboard side of the wheel, one of the cover discs comprising a first annular wall portion which defines a peripherally extending rim whereby the cover disc, in use, seats on the wheel and which first annular wall portion extends from the rim axially outwardly to a region of maximum axial extent, a second wall portion disposed radially inwardly of the first annular wall portion and which extends from the region of maximum axial extent axially inwardly, and a central, radially extending wall portion disposed axially inwardly of the region of maximum axial extent, and which wheel protector further comprises a disc-shaped document cover which is attachable to said one of the cover discs to form with the central portion a compartment for holding documents relating to the wheel on which the wheel protector is mounted.

12. A wheel protector according to claim 11, wherein the document cover has a window therein through which the documents are visible.

* * * * *